US011111011B2

United States Patent
Bottasso et al.

(10) Patent No.: US 11,111,011 B2
(45) Date of Patent: Sep. 7, 2021

(54) ROTOR FOR AN AIRCRAFT CAPABLE OF HOVERING

(71) Applicant: LEONARDO S.P.A., Rome (IT)

(72) Inventors: Luigi Bottasso, Samarate (IT); Antonio Zocchi, Samarate (IT); Massimo Brunetti, Samarate (IT); Luca Medici, Samarate (IT); James Wang, Samarate (IT); Giorgio Lucchi, Rimini (IT)

(73) Assignee: LEONARDO S.P.A., Rome (IT)

( * ) Notice: Subject to any disclaimer, the term of this patent is extended or adjusted under 35 U.S.C. 154(b) by 269 days.

(21) Appl. No.: 16/474,097

(22) PCT Filed: Dec. 29, 2017

(86) PCT No.: PCT/EP2017/084808
§ 371 (c)(1),
(2) Date: Jun. 27, 2019

(87) PCT Pub. No.: WO2018/122373
PCT Pub. Date: Jul. 5, 2018

(65) Prior Publication Data
US 2020/0122825 A1    Apr. 23, 2020

(30) Foreign Application Priority Data

Dec. 30, 2016    (EP) .................................... 16207524

(51) Int. Cl.
*B64C 27/32*    (2006.01)
*B64D 41/00*    (2006.01)
(Continued)

(52) U.S. Cl.
CPC .............. *B64C 27/32* (2013.01); *B64C 27/12* (2013.01); *B64C 27/82* (2013.01); *B64D 15/12* (2013.01); *B64D 41/00* (2013.01); *F16H 1/46* (2013.01)

(58) Field of Classification Search
CPC .......... B64C 27/12; B64C 27/32; B64D 41/00
See application file for complete search history.

(56) References Cited

U.S. PATENT DOCUMENTS 2,772,745 A * 12/1956 Bordoni .................. B64C 27/12
                                                        416/130
5,607,122 A *  3/1997 Hicks ...................... B64C 27/78
                                                        244/17.19
(Continued)

FOREIGN PATENT DOCUMENTS

EP    2218643 A1    8/2010
EP    2610525 A1    7/2013
(Continued)

OTHER PUBLICATIONS

International Search Report and Written Opinion in corresponding International Patent Application No. PCT/EP2017/084808, dated Mar. 7, 2018. 15 pages.

(Continued)

*Primary Examiner* — Joseph W Sanderson
(74) *Attorney, Agent, or Firm* — Leason Ellis LLP

(57) ABSTRACT

A rotor for an aircraft capable of hovering includes a stationary support structure and a rotative element which is rotatable about an axis with respect to the stationary support structure. The rotor has at least one blade, which is operatively connected with a rotative element. The rotor has a source of a magnetic field, which is either stationary or driven in rotation at a first rotational speed and an electric conductive element, which is operatively connected to the rotative element and can be driven in rotation at a second rotational speed different from first rotational speed. An electric conductive element is electromagnetically coupled so that an electromotive force is magnetically induced in electric conductive element itself Two rings extend radially inward from a tubular body of the rotor hub with the first (Continued)

ring connected to a plurality of thermally conductive rings of a flow deflector at an axial end of the rotor and the second ring supports the electric conductive element.

13 Claims, 6 Drawing Sheets

(51) Int. Cl.
   *B64C 27/12* (2006.01)
   *B64C 27/82* (2006.01)
   *B64D 15/12* (2006.01)
   *F16H 1/46* (2006.01)

(56) References Cited

U.S. PATENT DOCUMENTS

| | | | | |
|---|---|---|---|---|
| 5,704,567 | A | 1/1998 | Maglieri | |
| 6,193,189 | B1* | 2/2001 | Keever | B64D 27/04 244/17.19 |
| 6,769,874 | B2* | 8/2004 | Arel | B64C 11/02 416/60 |
| 6,902,508 | B2* | 6/2005 | Stille | B64C 27/12 464/182 |
| 8,162,611 | B2* | 4/2012 | Perkinson | B64C 11/06 416/162 |
| 8,294,316 | B2* | 10/2012 | Blackwelder | B64D 15/12 310/115 |
| 8,464,511 | B1* | 6/2013 | Ribarov | H02K 7/14 60/226.1 |
| 8,534,596 | B2* | 9/2013 | Lauder | B64C 27/10 244/17.19 |
| 8,757,972 | B2* | 6/2014 | Perkinson | B64D 15/12 416/1 |
| 8,795,123 | B2* | 8/2014 | Gasparini | F16H 57/04 475/159 |
| 9,024,505 | B2* | 5/2015 | Doyle | B64C 27/605 310/268 |
| 9,067,684 | B2* | 6/2015 | Giordano | B64C 27/32 |
| 9,425,670 | B2* | 8/2016 | Mariotto | H02K 7/006 |
| 9,725,179 | B2* | 8/2017 | Aubert | B64D 15/12 |
| 9,828,109 | B2* | 11/2017 | Mitrovic | B64C 11/44 |
| 9,973,058 | B2* | 5/2018 | Perkinson | H02K 7/1823 |
| 10,053,212 | B2* | 8/2018 | Sheridan | B64C 27/10 |
| 10,243,424 | B2* | 3/2019 | Raad | B64D 15/12 |
| 10,717,543 | B2* | 7/2020 | Mitrovic | B64C 11/44 |
| 2004/0080234 | A1* | 4/2004 | Arel | B64D 15/12 310/261.1 |
| 2005/0153812 | A1* | 7/2005 | Box | B64C 39/024 475/257 |
| 2010/0021295 | A1* | 1/2010 | Perkinson | B64C 11/06 416/1 |
| 2010/0270423 | A1* | 10/2010 | Lauder | B64C 7/00 244/17.19 |
| 2011/0024567 | A1* | 2/2011 | Blackwelder | F02K 3/072 244/134 D |
| 2012/0299428 | A1* | 11/2012 | Doyle | B64C 27/605 310/154.43 |
| 2013/0039759 | A1* | 2/2013 | Perkinson | B64C 11/306 416/1 |
| 2013/0172143 | A1* | 7/2013 | Gasparini | B64C 27/12 475/159 |
| 2013/0174533 | A1* | 7/2013 | Ribarov | F02C 3/067 60/226.1 |
| 2013/0228654 | A1* | 9/2013 | Aubert | B64D 15/12 244/134 D |
| 2014/0312722 | A1 | 10/2014 | Raad | |
| 2015/0028594 | A1* | 1/2015 | Mariotto | H02K 7/108 290/52 |
| 2016/0229549 | A1* | 8/2016 | Mitrovic | F16H 3/666 |
| 2016/0233740 | A1* | 8/2016 | Perkinson | H02K 7/1823 |
| 2017/0005548 | A1* | 1/2017 | Salat | B64D 15/12 |
| 2017/0190415 | A1* | 7/2017 | Sheridan | F16H 1/46 |
| 2018/0118369 | A1* | 5/2018 | Mitrovic | B64D 27/10 |
| 2019/0329876 | A1* | 10/2019 | Brunetti | B64C 27/12 |
| 2019/0352000 | A1* | 11/2019 | Bottasso | B64C 27/001 |

FOREIGN PATENT DOCUMENTS

| | | |
|---|---|---|
| EP | 2629407 A1 | 8/2013 |
| EP | 2977314 A1 | 1/2016 |
| EP | 2977315 A1 | 1/2016 |
| GB | 2461786 A | 1/2010 |
| WO | 9619380 A1 | 6/1996 |
| WO | 03078248 A1 | 9/2003 |
| WO | 2005100154 A1 | 10/2005 |
| WO | 2011040946 A1 | 4/2011 |
| WO | 2011119458 A1 | 9/2011 |
| WO | 2015092215 A2 | 6/2015 |

OTHER PUBLICATIONS

European Search Report in corresponding European Patent Application No. 16207524.6, dated Jul. 12, 2017. 11 pages.

* cited by examiner

ROTOR FOR AN AIRCRAFT CAPABLE OF HOVERING

CROSS-REFERENCE TO RELATED PATENT APPLICATIONS

This application is a U.S. National Phase Application under 35 U.S.C. § 371 of International Patent Application No. PCT/EP2017/084808, filed Dec. 29, 2017, which claims priority from European Patent Application No. 16207524.6 filed on Dec. 30, 2016, the disclosure of which is incorporated by reference.

TECHNICAL FIELD

The present invention relates to an aircraft capable of hovering, in particular a helicopter or a convertiplane.

BACKGROUND ART

Known helicopters comprise a fuselage, a main rotor upwardly protruding from the fuselage and a tail rotor which is arranged at a tail of the fuselage. Furthermore, known helicopters comprise a turbine, a main transmission group which transmits the motion from the turbine to the main rotor, and an additional transmission group which transmits the motion from the main transmission group to the tail rotor. Main rotor and tail rotor comprise, each:
  a stationary case;
  a mast which is driven in rotation by the main or the additional transmission group about its own axis;
  a hub driven in rotation by the mast; and
  a plurality of blades which are articulated with respect to the hub.

A need is felt in the art to provide the rotating components of the main and tail rotor, i.e. the mast, the hub and the blades, with electrical power. For example, the electrical power can be used for activating a de-icing or anti-icing system formed by a plurality of electrical conductors embedded in the blades and adapted to heat the relative blades by Joule effect or for activating some movable surfaces on the blades. In order to provide the rotating components of the main rotor with the required electrical power, known helicopters normally comprise an electrical generator operated by a shaft connected to the main transmission group and a slip-ring. The slip-ring transmits the electrical power by creating a rubbing contact from stationary conductors electrically connected to the generator to the rotating conductors of the main or tail rotor. Even if well performing, the previously described solutions leave room for improvements. As a matter of fact, the slip-ring is complex to manufacture and maintain, and is easily subjected to wear effect. This drawback is exacerbated especially in anti-torque tail rotors, which rotate at higher speed than the main rotor. Furthermore, in case of lightning strike, the presence of a necessary conductive path between stationary and rotating conductors of the main and tail rotor can propagate dangerous current peaks from the fixed to the rotating conductors or vice versa.

A need is therefore felt within the industry to transmit the electrical power to the rotating parts of the main or tail rotor, while eliminating the aforesaid drawbacks in a straightforward, low-cost manner. Furthermore, a need is felt to transmit the electrical power with a solution integrated inside the limited size of the rotor head in order to allow efficient heat dissipation and/or which could be easily retrofitted in existing main or tail rotor.

EP-A-2629407 discloses an aircraft that is capable of hovering.

DISCLOSURE OF INVENTION

It is an object of the present invention to provide a rotor for an aircraft capable of hovering, which meets at least one of the above requirements.

The aforementioned object is achieved by the present invention as it relates to an aircraft capable of hovering, as described herein.

BRIEF DESCRIPTION OF THE DRAWINGS

Four preferred embodiments are hereinafter disclosed for a better understanding of the present invention, by way of non-limitative example and with reference to the accompanying drawings, in which.

BEST MODE FOR CARRYING OUT THE INVENTION

Figure 1:
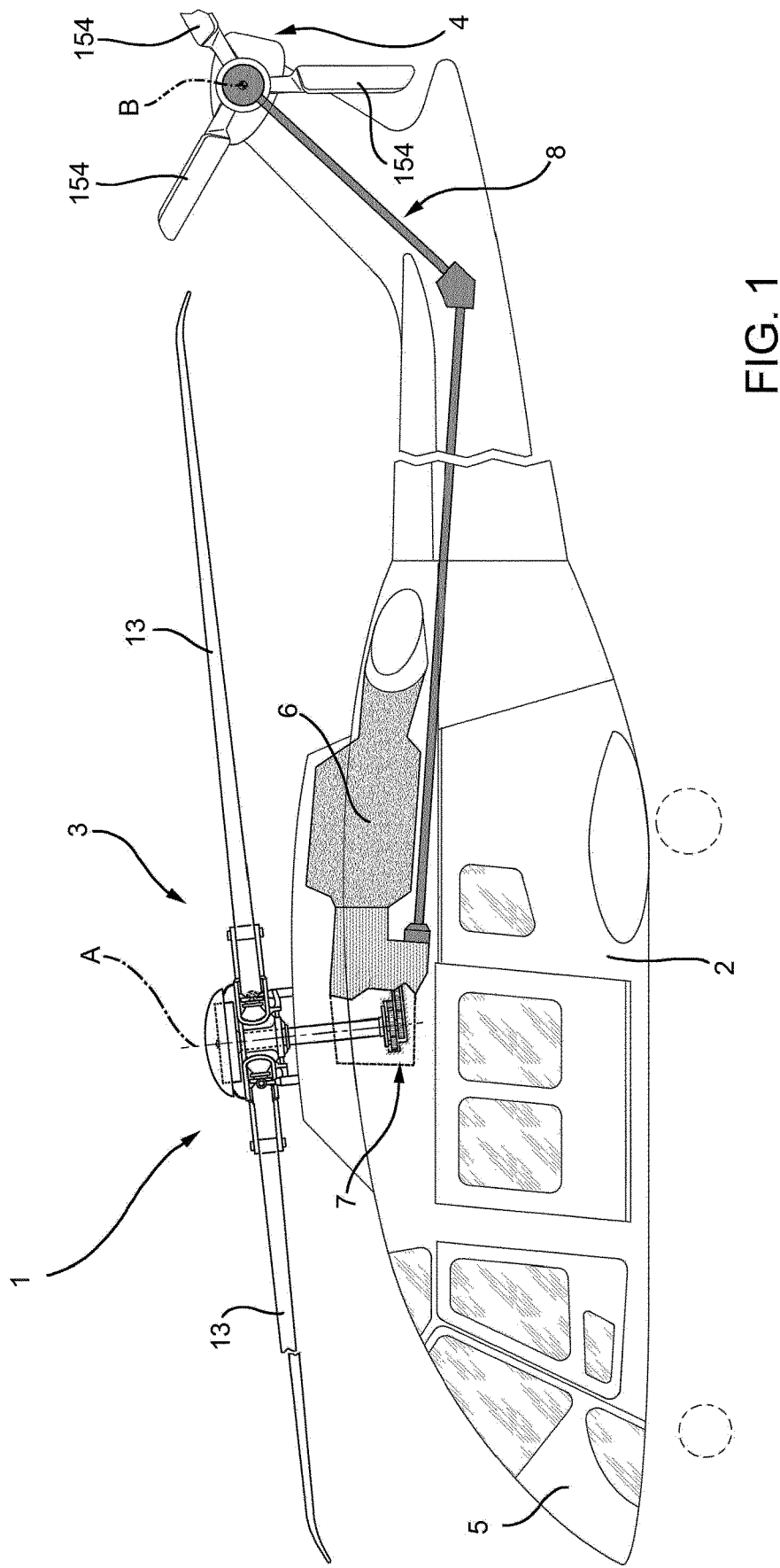
FIG. 1 is a schematic view of a helicopter comprising a main and a tail rotor in accordance to the present invention.

With reference to FIG. 1, numeral 1 indicates an aircraft capable of hovering, in particular a helicopter. Helicopter 1 essentially comprises (FIG. 1) a fuselage 2 with a nose 5; a main rotor 3 fitted to the top of fuselage 2 and rotatable about an axis A; and an anti-torque tail rotor 4 fitted to a fin projecting from fuselage 2 at the opposite end to nose 5. More specifically, main rotor 3 provides helicopter 1 with the lift to raise it, and the thrust to move it forward, while rotor 4 exerts force on the fin to generate a straightening torque on fuselage 2. The straightening torque balances the torque exerted on fuselage 2 by main rotor 3, and which would otherwise rotate fuselage 2 about axis A. Helicopter 1 also comprises:
  a pair of turbines 6 (only one of which is shown);
  a main transmission group 7, which transmits the motion from turbine 6; and
  an additional transmission group 8, which transmits the motion from main transmission group 7 to tail rotor 4.

Figure 2:
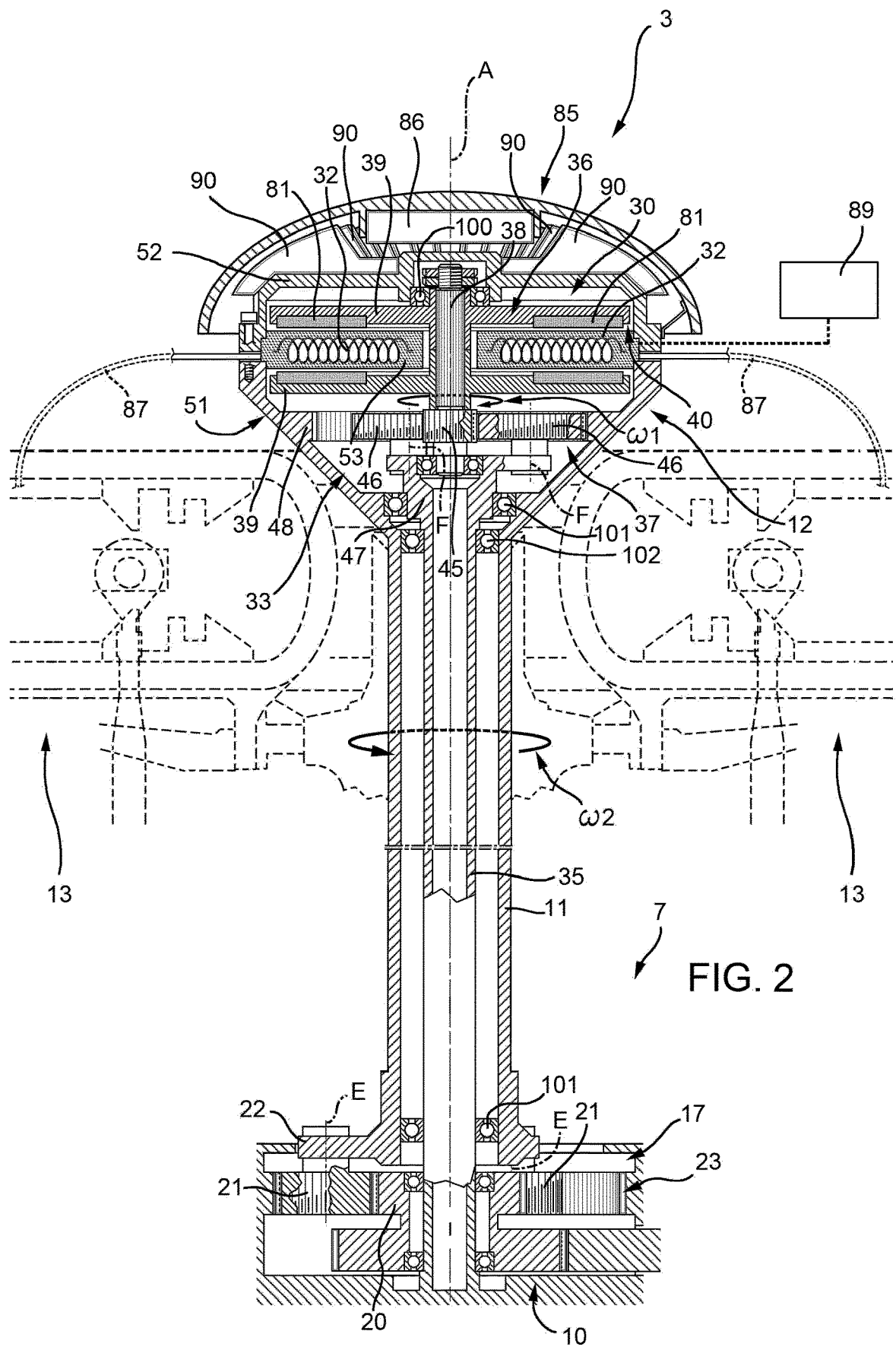
FIG. 2 is a transversal section of a first embodiment of the main rotor of FIG. 1.

With reference to FIG. 2, rotor 3 substantially comprises:
  a support element 10, which is fixed to fuselage 2;
  a mast 11, which is rotatable about an axis A with respect to support element 10;
  a hub 12, which is rotationally integral to mast 11; and
  a plurality of blades 13 (only two of which are shown in FIG. 2), which are articulated onto hub 12.

In the embodiment shown, support element 10 is stationary with respect to axis A. Furthermore, support element 10, mast 11 and hub 12 are hollow.

Rotor 3 also comprises an epicyclic gear train 17, which transmits the motion from an end shaft (not shown) of main transmission group 7 to mast 11 and hub 12.

In detail, epicyclic gear train 17 is coaxial to axis A and comprises:
- a sun gear 20 which is driven in rotation about axis A and comprises a radially outer toothing;
- a plurality of planetary gears 21 (only two shown in FIG. 2) which comprise, each, a radially inner toothing meshing with sun gear 20 and a radially outer toothing meshing with a radially inner toothing defined by support element 10; and
- a carrier 22 which is rotationally integral with and connected to planetary gears 21 and to mast 11.

In particular, support element 10 acts as a stationary crown 23 of epicyclic gear train 17. Planetary gears 21 rotate about relative axes E parallel to axis A and revolve about axis A.

Advantageously, rotor 3 comprises:
- a source 30 of magnetic field, which is driven in rotation about axis A with a first rotational speed ω1; and
- an electric conductive element 32, which is operatively connected to mast 11 and is driven in rotation at a second rotational speed ω2 different from first rotational speed ω1;
- electric conductive element 32 is electromagnetically coupled with said source 30, so that an electromotive force is magnetically induced, in use, in electric conductive element 32 itself.

In this way, source 30 and electric conductive element 32 form an electrical generator, which induces an electromotive force in mast 11 and, therefore, in hub 12 and blades 13, due to the differential rotational speed ω2-ω1. In the embodiment shown, electrical generator is an axial flux machine, in which the magnetic field generated by source 30 is mainly directed parallel to axis A. In the embodiment shown, source 30 comprises a plurality of permanent magnets 81 while electric conductive element 32 is a winding.

Rotor 3 further comprises:
- a shaft 35, which is elongated parallel to axis A and is fixed to support structure 10; and
- a support element 36, which supports source 30, is rotatable about axis A at rotational speed ω1; and
- an epicyclic gear train 37.

Support element 36 comprises:
- a shaft 38 elongated about axis A;
- a pair of disks 39 protruding from shaft 38 orthogonally to axis A.

Disks 39 comprise respective faces 40 which face with one another along axis A and to which permanent magnets 81 are fitted.

Epicyclic gear train 37 substantially comprises:
- a radially outer toothing defined by an axially end gear 45 of shaft 38, which is arranged on the same axial side of support structure 10;
- a plurality of planetary gears 46, which extend about respective axes F parallel to and staggered from axis A and have, each, a radially outer toothing with respect to relative axis F meshing with radially outer toothing of end gear 45;
- a carrier 47, which is rotationally integral and connected to planetary gears 46 on one axial side and is connected to shaft 35 on the other axial side; and
- an annular ring 48, which connected to and rotationally integral with hub 12 and which comprises a radially inner toothing with respect to axis A meshing with radially outer toothing of planetary gears 46.

Planetary gears 46 rotate about respective axes F revolve about axis A. Hub 12 comprises, in addition to ring 48, a main tubular body 51 and a pair of rings 52, 53 which extend from body 51 towards axis A and orthogonally to axis A. Ring 52 bounds hub 12 on the opposite axial side of shaft 35. Ring 53 is axially interposed between rings 52, 48. Furthermore, ring 48 extends from body 51 towards axis A and orthogonally to axis A. Electric conductive element 32 is fitted to ring 52. Ring 52 is axially interposed between disks 39 of support element 26. In this way, electric conductive element 32 faces permanent magnets 81. Accordingly, permanent magnets 81 induce, by means of Faraday's law, an electromotive force on electric conductive element 32. Rings 52, 53 surround shaft 38 and shaft 35 respectively with the interposition of a radial gap.

It is therefore possible to identify three assemblies inside rotor 3, which have relative rotational speed about axis A:
- support structure 10 and shaft 35, which are stationary about axis A;
- support element 36 and source 30, which rotate with rotational speed ω1 in a first direction about axis A; and
- mast 11, hub 12 with conductive electric element 32, which rotate with rotational speed ω2 in a second direction, opposite to first direction, about axis A.

Rotor 3 also comprises a hollow flow deflector 85, which is connected to an axial end of hub 12 and is rotationally integral with hub 12. Flow deflector 85 bounds rotor 3 on the opposite axial side with respect to support structure 10. Flow deflector 85 houses one disk 39, a top axial end of shaft 38 opposite to shaft 46, and ring 52. Furthermore, flow deflector 85 houses an electronic control unit 86 for controlling permanent magnets 81 and electric conductive element 32, as well as other systems for example AC/DC converters. In one embodiment, flow deflector 85 is provided with an electrical power storage device 89, which is charged by the electrical current flowing inside electrical conductive element 32. Flow deflector 85 is made in metal and comprises a plurality of thermally conductive rings 90 which are, in the embodiment shown, connected to ring 52. Electric conductive element 32 is electrically connected to blades 13 by means of electric wires 87. In this way, electrical current is available to blades 13. In one embodiment, blades 13 comprise an electric circuit embedded inside blades 13 themselves and fed with electrical current. This electric circuit operates as an anti-icing system. In another embodiment, blades 13 comprise actuators, which are fed with electrical current.

Rotor 3 further comprises, with respect to axis A:
- a bearing 100, which is radially interposed between shaft 38 and hub 12, with respect to axis A; and
- a pair of axially spaced bearings 101 which are radially interposed between shaft 35 and mast 11 and hub 12, with respect to axis A.

In use, the end shaft of main transmission group 7 drives in rotation sun gear 20 of epicyclic gear train 17 about axis A. Accordingly, also planetary gear 21 and carrier 22 rotate about axis A, thus driving in rotation mast 11, hub 12 and blades 13 about same axis A. Blades 13 are driven in rotation by hub 12 about axis A and can move with respect to hub 12 in a known manner. Hub 12, ring 48 and therefore electrical conductive element 32 rotate about axis with rotational speed ω2 about axis A.

In the meanwhile, epicyclic gear train 37 receives the motion from ring 48 rotating with rotational speed ω2 about axis A and drives in rotation support element 36 and, therefore, source 30 and permanent magnets 81 with a rotational speed ω1 about axis A. In particular, ring 48 integral with hub 12 meshes with planetary gears 46 stationary about axis A, and planetary gears 46 mesh with gear 45 rotationally integral with support element 36 and source 30. As a result, source 30 rotates with rotational speed ω1, electric conductive element 32 rotates with rotational speed ω2 different from rotational speed ω1, and permanent magnets 81 and conductive element 32 face with one another along axis A. Thus, an electromotive force is magnetically induced, by means of Faraday's law, in electric conductive element 32 rotating integrally with hub 12. Electrical wires 87 transfer electromotive force from conductive element 32 on hub 12 to blades 13. This electromotive force is used for several purposes. For example, it can be used for feeding electrical circuits inside blades 13 and providing de-icing or anti-icing function. Alternatively or in combination, the electromotive force can be used for operating the actuators fitted to blades 13, e.g. for active aerodynamic control. The heat generated by the operation of source 30 and electrical conductive element 32 is dissipated by means of convection, thanks to air continuously flowing inside flow deflector 85, and by means of conduction, thanks to the fact that flow deflector 85 is made in metal and comprises rings 90 for thermal dissipation.

In case of fault of turbine 6, the electric power stored in electrical power storage device 89 housed in flow deflector 85 can be used for example to sustain the autorotation of hub 12 for a limited amount of time necessary to safely complete the autorotation maneuver.

Figure 3:
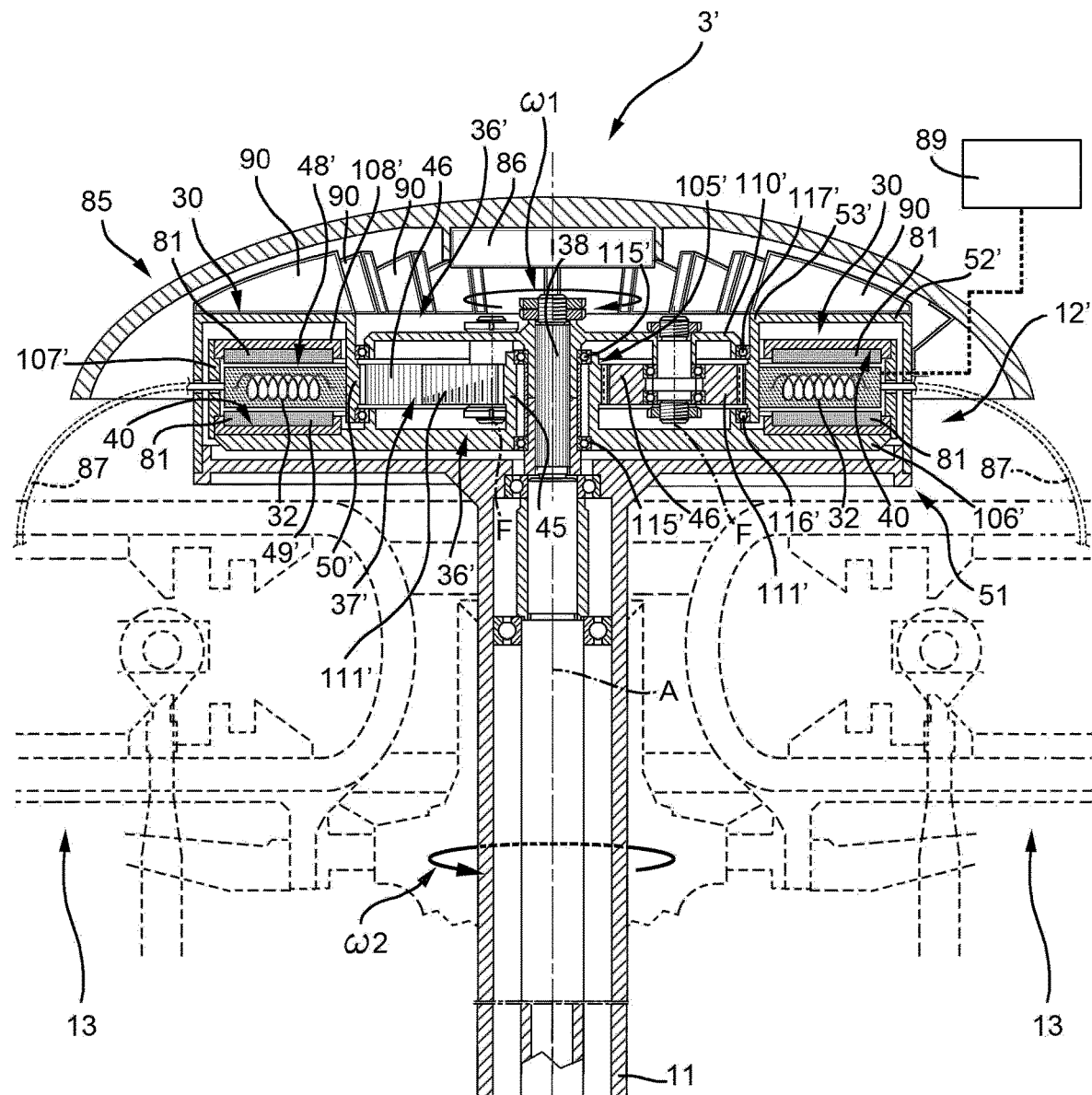
FIG. 3 is a transversal section of a second embodiment of the main rotor of FIG. 1.

With reference to FIG. 3, 3' indicates, as a whole, a main rotor according to a second embodiment of the present invention.

Rotor 3' is similar to rotor 3 and will be described hereinafter only as far as it differs therefrom; corresponding or equivalent parts of rotors 3, 3' will be indicated where possible by the same reference numbers. In particular, rotor 3' differs for rotor 3 in that hub 12' comprises, instead of rings 52, 53 and ring 48:
- an annular disk 52' protruding from an axial end of body 51 arranged on the side of flow deflector 85 towards axis A and lying on a plane orthogonal to axis A;
- a cylindrical wall 53' protruding from a radial inner end of disk 52' towards support structure 10, coaxial to axis A and having an axial length smaller than body 51; and
- a ring 48' protruding from an axial end of wall 53' opposite to disk 52', lying on a plane orthogonal to axis A.

In particular, ring 48' comprises, with respect to axis A:
- a radially outer portion 49', which extends on the radial outer side of wall 53' on the opposite side of axis A; and
- a radially inner portion 50', which extends on the radial inner side of wall 53' towards axis A.

Support element 36' differs from support element 36 for comprising:
- a tubular body 105', which extends about axis A, surrounds an axial end of shaft 35 arranged on the side of flow deflector 85, and is rotatable about axis A with rotational speed ω1 with respect to stationary shaft 35;
- a disk 106', which lies on a plane orthogonal to axis A and radially protrudes from axial end of body 105' arranged on the side of support structure 10;
- a tubular wall 107', which extends about axis A, is radially opposite to body 105', axially protrudes from a radially outer end of disk 106' and is separated by a radial gap from body 51 of hub 12'; and
- a disk 108', which radially protrudes from an axial end of wall 107' opposite to disk 106' and towards axis A.

Disk 108' is separated by an axial gap from disk 52' and by a radial gap from wall 107'. Permanent magnets 81 are fitted on disk 108' and disk 106' and axially face with one another. Portion 49' of ring 48' is axially interposed between disks 106', 108' and supports electric conductive element 32 in an axially interposed position between permanent magnets 81. Support element 36' differs from support element 36 for comprising:
- a carrier 110', which axially protrudes from an axial end of shaft 35 and lies on a plane orthogonal to axis A; and
- a plurality of planetary gears 111' fitted to carrier 110' and which mesh, each, with a radially inner toothing of portion 50' of ring 48' and with a radially outer toothing of body 105'.

In this way, epicyclic gear train 37' is formed by stationary planetary gears 111', body 105' rotating at rotational speed ω1 together with permanent magnets 81 and ring 48' rotating with hub 12 and rotational speed ω2. Rotor 3' further comprises, with reference to axis A:
- a pair of axially spaced bearing 115' radially interposed between shaft 35 and body 105';
- a bearing 116' axially interposed between wall 53' and disk 106'; and
- a bearing 117' radially interposed between wall 53' and carrier 110'.

The operation of rotor 3' is similar to the one of rotor 4 and is therefore not described in detail.

Figure 4:
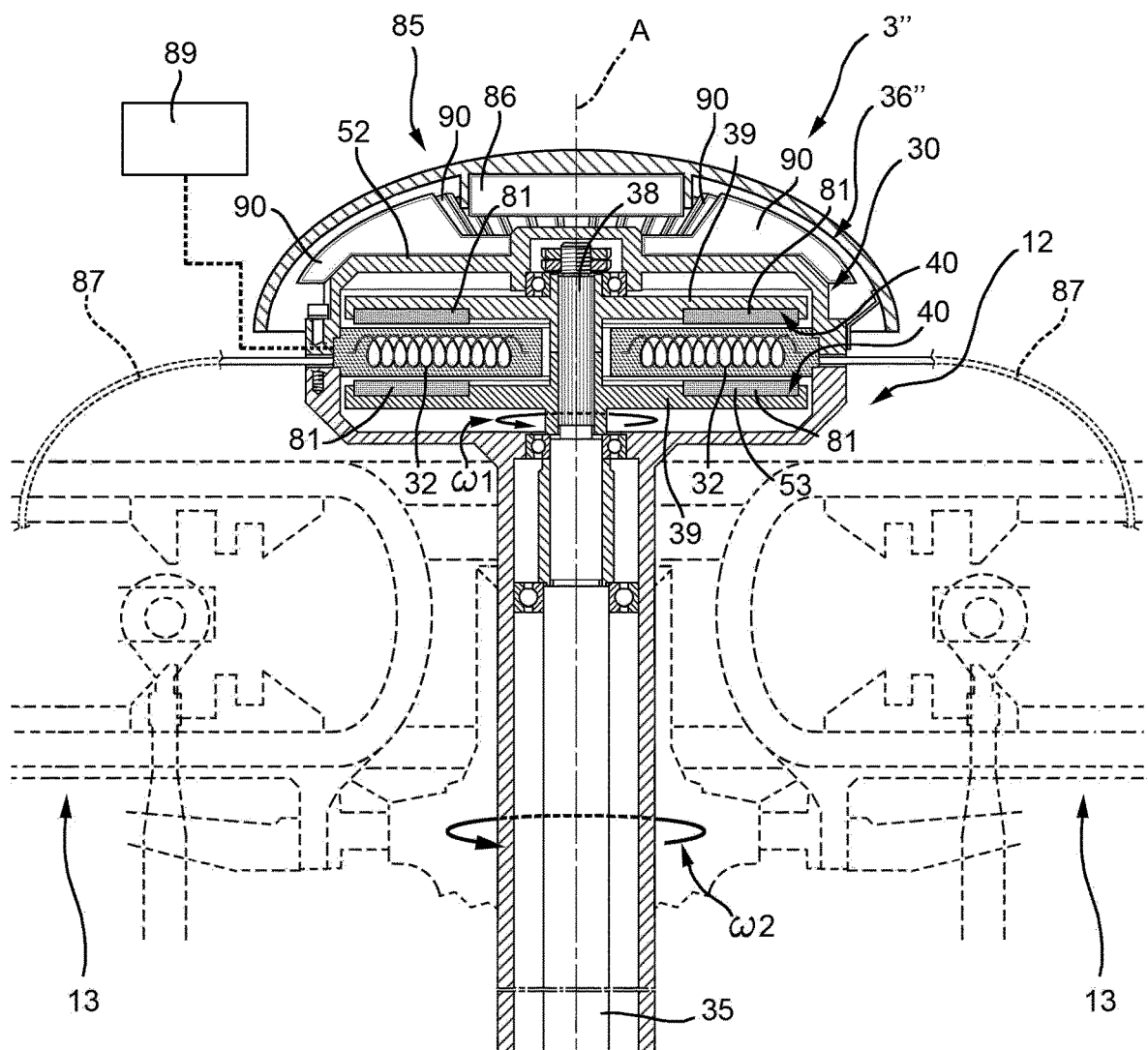
FIG. 4 is a transversal section of a third embodiment of the main rotor of FIG. 1.

With reference to FIG. 4, 3" indicates, as a whole, a rotor according to a second embodiment of the present invention.

Rotor 3" is similar to rotor 3 and will be described hereinafter only as far as it differs therefrom; corresponding or equivalent parts of rotors 3, 3" will be indicated where possible by the same reference numbers.

In particular, rotor 3" differs for rotor 3 in that shaft 35 is rotationally integral and connected to sun gear 20, support element 36" is rotationally integral and connected to shaft 35, and for not comprising epicyclic gear train 37. In this way, source 30 and permanent magnets 81 are driven in rotation by sun gear 20 about axis A with rotational speed ω2.

The operation of rotor 3" is similar to rotor 3 and is described only insofar as it differs from that of rotor 3. In particular, sun gear 20 drives in rotation at rotational speed ω1 the whole assembly formed by shaft 35, support element 36", source 30 and permanent magnets 81.

Figure 5:
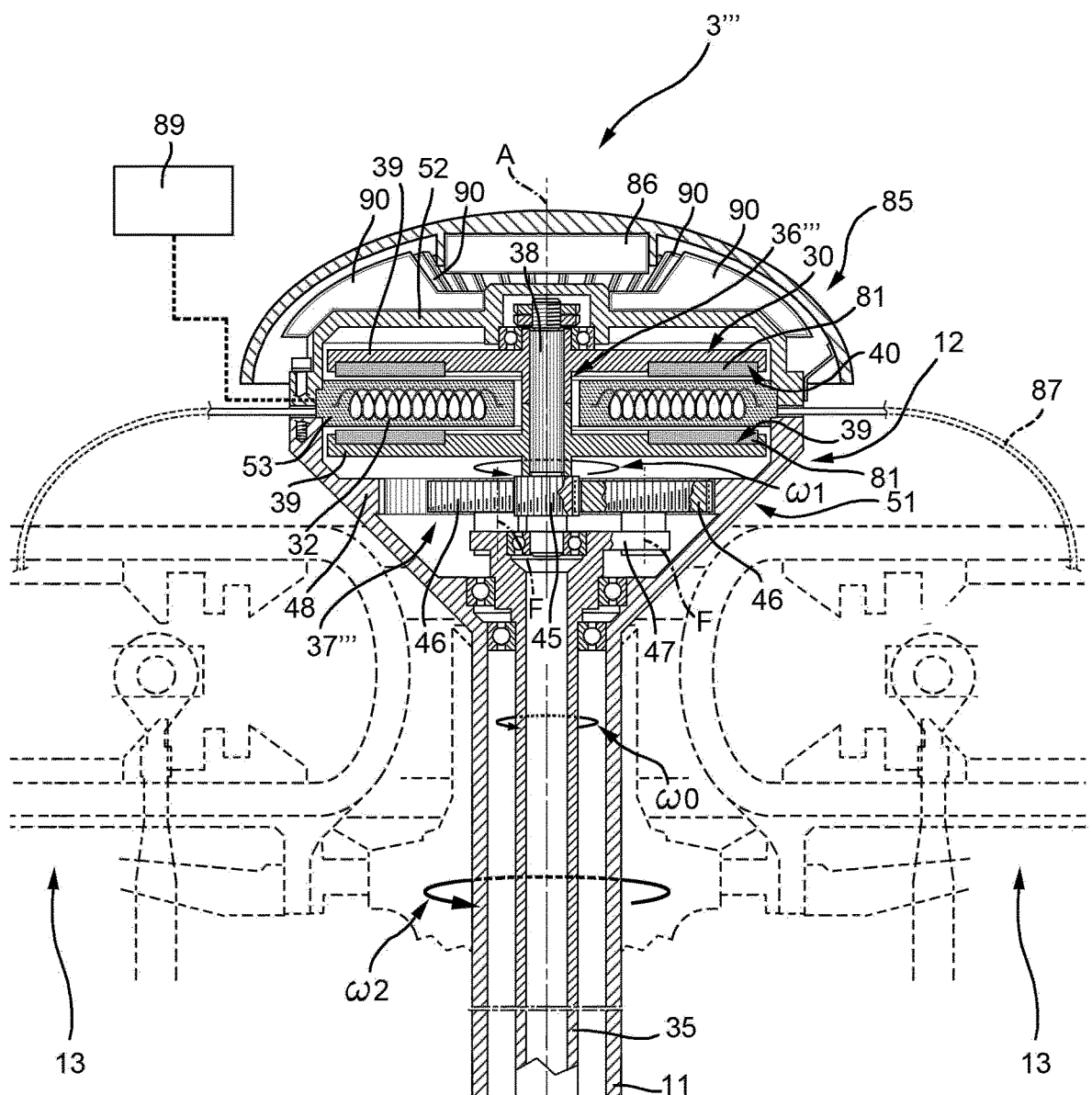
FIG. 5 is a transversal section of a fourth embodiment of the main rotor of FIG. 1.

With reference to FIG. 5, rotor 3''' is similar to rotor 3 and will be described hereinafter only as far as it differs therefrom; corresponding or equivalent parts of rotors 3, 3''' will be indicated where possible by the same reference numbers. In particular, rotor 3''' differs for rotor 3 in that shaft 35 is rotationally integral and connected to sun gear 20 and is driven in rotation at rotational speed ω0.

Furthermore, rotor 3''' differs from rotor 3 in that epicyclic gear train 37''' receives the motion from shaft 35 rotating at rotational speed ω0 and drives in rotation support element 36''', source 30 and permanent magnets 81 about axis B with rotational speed ω1.

It should be noted that rotational speed ω1 in rotor 3''' is higher than rotational speed ω1 in rotor 3. Accordingly, the differential rotational ω2-ω1 generating the electromotive force is higher in rotor 3''' than in rotor 3. Rotational speed ω0, ω1, ω2 are directed in the same direction.

It is therefore possible to identify three assemblies inside rotor 3''', which have relative rotational speed about axis A:
- shaft 35, which rotates with rotational speed ω0 about axis A in a first direction;
- support element 36''' and source 30, which rotate with rotational speed ω1 in the first direction about axis A; and mast 11, hub 12 with conductive electric element 32, which rotate with rotational speed ω2 in the first direction, opposite to first direction, about axis A.

The operation of rotor 3''' is similar to rotor 3 and is described only insofar as it differs from that of rotor 3. In particular, sun gear 20 drives in rotation at rotational speed ω0 shaft 35 and planetary gears 46 of epicyclic gear train 37'''. The latter drives in rotation, in turn, support element 36''', source 30 and permanent magnets 81 about axis B with rotational speed ω1.

Figure 6:
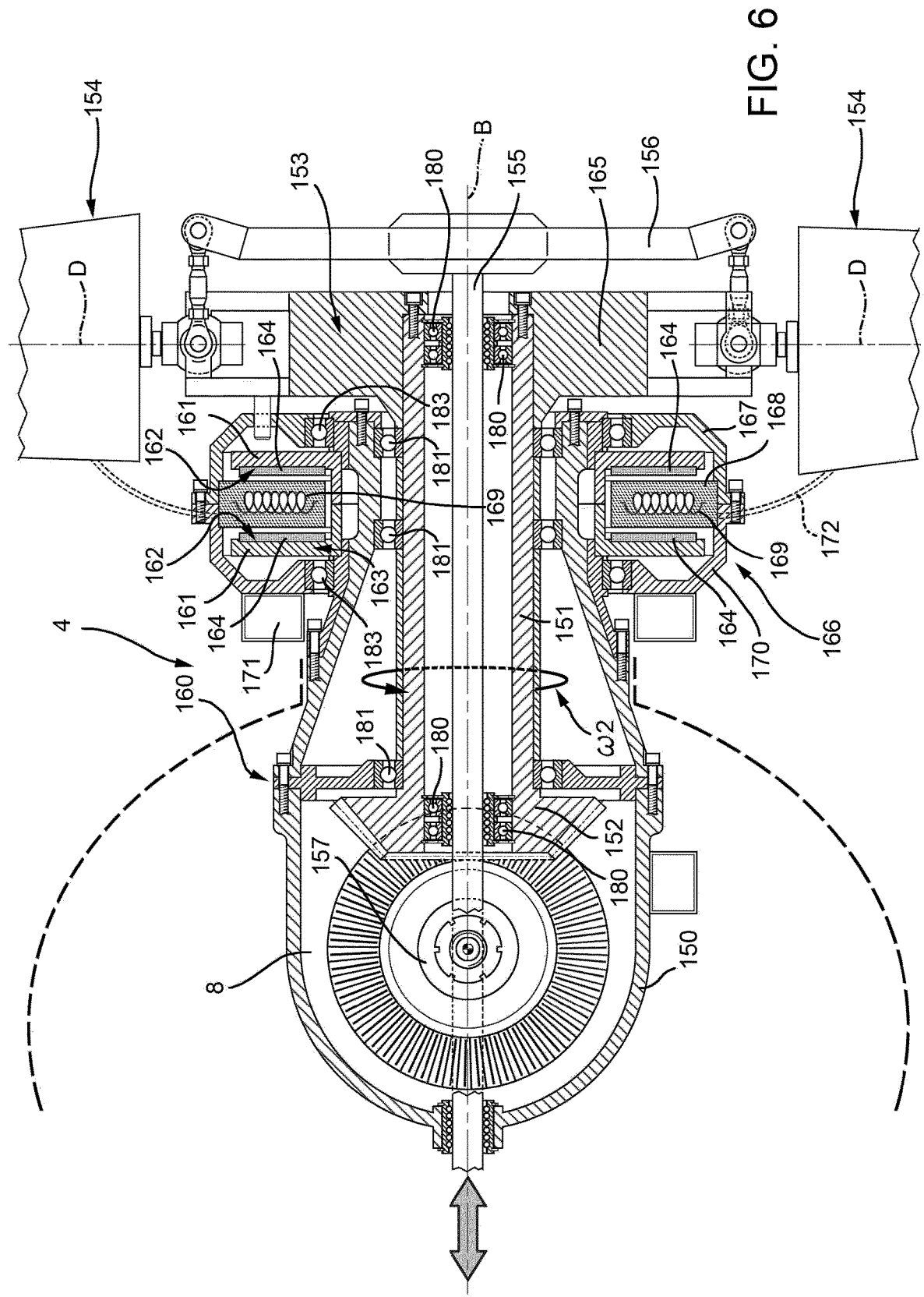
FIG. 6 is a transversal section of an embodiment of the tail rotor of FIG. 1, which is shown only for illustrative purposes.

With reference to FIG. 6, anti-torque rotor 4 substantially comprises:
- a hollow housing 150 which is fitted to fuselage 2;
- a hollow mast 151, which rotatable about an axis B transversal to axis A with a rotation speed ω2 and is connected to an end shaft 157 of additional transmission group 8 by means of a bevel gear 152 arranged at an axial end of mast 151;
- a hub 153 which is rotationally integral with and connected to mast 151; and
- a plurality of blades 154 (only two of which are shown in FIG. 6), which are articulated onto hub 153 and extend along respective longitudinal axes D.

Bevel gear 152 and mast 151 are contained inside housing 150. Hub 153 and blades 154 extend outside housing 150.

Rotor 4 also comprises a control rod 155, which extends along axis B and is slidable along axis B with respect to mast 151. Control rod 155 comprises an axial end on the opposite side of gear 152 which is fixed to lever 156. Lever 156 extends transversally to axis B and is connected to blades 154 eccentrically to relative axes D. In this way, the movement of rod 155 along axis B causes the rotation of blades 154 along relative axes D and the adjustment of relative pitch angles.

In greater detail, housing 150 comprises:
- a main body 160 elongated along axis B; and
- a pair of annular disks 161, which radially protrude from body 160 on the opposite side of axis B and lie on relative planes orthogonal to axis B. Disks 161 comprise relative surface 162, which axially face with one another and to which respective source 163 of magnetic field are fitted, in particular permanent magnets 164.

Hub 153 comprises:
- a body 165, which is connected to mast 151, is arranged in front of an axial end of housing 150 on the axial opposite side with respect to bevel gear 152; and
- a body 166, which is connected to body 165 and surrounds an open axial end of housing 150 opposite to bevel gear 152. In greater detail, blades 154 are articulated onto body 165. Body 166 comprises, proceeding along axis B from body 165 towards bevel gear 152: an annular ring 167 connected to body 165; an annular ring 168 onto which an electric conductive element 169 is fixed; and an annular ring 170 onto which an electronic control unit 171 for controlling electric conductive element 169 is fitted. Ring 168 is axially interposed between disks 161. Conductive element 169 is axially interposed between permanent magnets 164. In this way, electric conductive element 169 rotating at rotational speed ω2 is magnetically coupled with source 163 of magnetic field rotating at rotational speed ω1=0. Accordingly, source 163 and electric conductive element 169 form an electrical generator, which induces by Faraday's law an electromotive force in mast 151 and, therefore, in hub 152 and blades 154, due to the differential rotational speed ω2−ω1=ω2. In the embodiment shown, electrical generator is an axial flux machine, in which the magnetic field generated by source 163 is mainly directed parallel to axis B. Electric conductive element 169 is electrically connected to blades 154 by means of electric wires 172. In this way, electrical current is available to blades 133. In one embodiment, blades 154 comprise an electric circuit embedded inside blades 154 themselves and fed with electrical current. This electric circuit operates as an anti-icing system or de-icing system. In another embodiment, blades 154 comprise actuators, lights or other systems which are operated with electrical current. Finally, rotor 4 comprises, with respect to axis B: a plurality of bearings 180 radially interposed between control rod 155 and mast 152; bearings 181 radially interposed between mast 152 and a radially inner surface of housing 150; and bearings 183 radially interposed between a radially outer surface of housing 150 and relative disks 167, 170.

In use, end shaft 157 of additional transmission group 8 drives in rotation bevel gear 152 about axis B at rotational speed ω2. Accordingly, also hub 152 and blades 154 and electrical conductive element 169 are driven in rotation about axis B with rotational speed ω2. Blades 154 are driven in rotation by hub 152 about axis B and can move with respect to hub 152 in a known manner. Furthermore, the pitch angles with respect to relative axes D of blades 154 can be adjusted by the sliding movement of control rod 155 along axis B. Source 163 and permanent magnets 164 are fitted to housing 150 and are stationary about axis B, i.e. source 163 and permanent magnets can be seen as rotating with a rotational speed ω1=0 about axis B. Thanks to the different rotational speed between electric conductive element 169 and source 163, an electromotive force is magnetically induced, by means of Faraday's law, in electric conductive element 169 rotating integrally with hub 152. Electrical wires 170 transfer electromotive force from conductive element 169 on hub 152 to blades 154. This electromotive force is used for several purposes. For example, it can be used for feeding electrical circuits inside blades 154 and providing de-icing or anti-icing function. Alternatively or in combination, the electromotive force can be used for operating the actuators fitted to blades 154.

The advantages of rotor 3, 3', 3", 3''' and the method according to the present invention will be clear from the foregoing description.

In particular, source 30 of magnetic field are either stationary or driven in rotation with a rotational speed ω1 which is smaller than rotational speed ω2 with which electrical conductive element 32 is driven in rotation about the same axis A. Due to the fact that source 30 and conductive element 32 are electromagnetically coupled, an electromotive force is induced, by Faraday's law, on conductive element 32, i.e. on rotating hub 12. It is therefore possible to generate an electromotive force and, therefore, an electric current on rotating part of rotor 3, 3', 3", 3''', i.e. hub 12, and blades 13, without any physical contact with support element 36, 36', 36". This electric current can be used for different purposes, e.g. for feeding the electric circuits embedded inside blades 13 and forming a de-icing or anti-icing system, and/or for driving actuators provided onto blades 13. Due to the above-configuration, the electromotive force can be generated in hub 12 and/or in blades 13 without any slip-ring between support structure 10 and hub 12. In this way, the wear effects which typically affect slip-ring and the need for periodic and time-consuming maintenance of the slip-ring are completely avoided. In addition, the absence a necessary conductive path between stationary and rotating conductors dramatically reduces the risk of damaging conductive elements 32. Furthermore, the electrical generator formed by source and electric conductive element 32 has a contained axial size and can be, therefore, easily integrated in the customary size of rotor 3, 3', 3", 3'", without requiring any re-designing thereof. For the same reasons, the electrical generator formed by source 30 and electric conductive element 32 can be easily retrofitted inside an already existing rotor 3, 3', 3", 3'". With reference to rotor 3, 3', 3'", epicyclic gear train 37, 37' allow to increase the differential rotational speed ω2−ω1 between electrical conductive element 32 and source 30 of magnetic field, with a reduced axial size. Accordingly, support element 32 and hub 12 can be made smaller and more weight efficient, because the higher the differential rotational speed ω2−ω1, the lower is the torque required for a given value of electrical power induced in electric conductive element 32. The lower the torque, the smaller the diameter and, therefore, the weight of support element 32 and hub 12, with evident advantages on the payload. This is particularly advantageous, when rotational speed ω2 of hub 12 is necessarily slow as in main rotor 3, 3', 3'". Furthermore, the electrical power can be stored in electrical power storage energy device 89, which could be housed, for example, in flow deflector 85. This electrical power energy device 89 could be used for driving in rotation hub 12 in case of fault of turbine 6, so as to sustain autorotation of helicopter 1. Finally, source 30 and electrical conductive element 32 are at least in part housed inside flow deflector 85. In this way, the convective heat dissipation is eased by the air which naturally flow inside flow deflector 85 and the conductive heat dissipation is eased by the fact that flow deflector 85 is made in metallic material and is provided with heat dissipating rings 90. The flow deflector 85 can also be easily removed, thus allowing an easy inspection and maintenance of source 30 and permanent magnets 81.

Clearly, changes may be made to rotor 3, 3', 3", 3'" and the method according to the present invention without, however, departing from the scope as defined in the accompanying Claims. In particular, the electrical generator formed by source 30 and electrical conductive element 32 could be a radial flux machine, in which the magnetic field generated by source 30 is mainly directed radially with respect to axis A. Furthermore, rotor 3, 3', 3", 3'" could comprise, instead of mechanical main and additionally transmission group 7, an electrical motor for driving rotor 3, 3', 3", 3'". In this case, rotor 3, 3', 3", 3'" would comprise a stator to which source 30 would be fitted and a rotor to which electrical circuit 32 would be fitted. Aircraft 1 could be a convertiplane instead of a helicopter.

The invention claimed is:

1. An aircraft (1) capable of hovering comprising:
a fuselage (2);
a main transmission group (7); and
a main rotor (3, 3', 3", 3'"), which is connected to said main transmission group (6) and is adapted to provide said aircraft (1) with the lift to raise it;
said main rotor (3, 3', 3", 3'") comprising:
a stationary support structure (10) fixed to said fuselage (2);
a rotative element (11), which is rotatable about a first axis (A) with respect to said stationary support structure (10);
at least one blade (13) which is operatively connected with said rotative element (11);
a source (30) of a magnetic field, which is either stationary or driven, in use, in rotation; and
an electric conductive element (32), which is operatively connected to said rotative element (11) and can be driven, in use, in rotation;
said electric conductive element (32) being electromagnetically coupled with said source (30), so that an electromotive force is magnetically induced, in use, in said electric conductive element (32) itself;
said rotor (3, 3', 3", 3'") further comprising:
a hub (12) operatively connected to said rotative element (11), rotatable with said second rotational speed (ω2) about said first axis (A) and onto which said blade (13) is articulated; and
a support element (36, 36', 36") to which said source (30) is fixed, and which is either stationary or rotatable with said first rotational speed (ω1) about said first axis (A);
said electric conductive element (32) being fixed to said hub (12);
characterized in that said rotor (3, 3', 3", 3'") comprises a flow deflector (85), which is arranged at an axial end of said rotor (3, 3', 3", 3'"), is rotatable about said first axis (A) integrally with said hub (12) and defines a compartment housing at least in part said support element (36, 36');
said hub (12) comprising:
a tubular body (51) and a first and a second ring (52, 53) which extend from said tubular body (51) towards said first axis (A) and orthogonally to said first axis (A);
said electric conductive element (32) being fitted to said second ring (53);
said flow deflector (85) being made in metal and comprising a plurality of thermally conductive rings (90), which are connected to said first ring (52, 52').

2. The aircraft of claim 1, characterized by comprising: a first epicyclic gear train (17);
said first epicyclic gear train (17) comprising:
a sun gear (20) which is connectable to an output shaft of said main transmission group (7) of said aircraft (1);
a crown gear (23) which is defined by and forms part of said support structure (10);
a plurality of planetary gears (21) which simultaneously mesh with said sun gear (20) and said crown gear (23); and
a first carrier (22), which is connected to said planetary gears (21) and to said rotative element (11, 151);
said planetary gears (21) being rotatable about respective second axes (E) parallel and distinct from said first axis (A) and being mounted to revolute about said first axis (A).

3. The aircraft of claim 2, characterized by comprising:
a connecting element (35), which is connected to said support structure (10) and stationary about said first axis (A); and
a second epicyclic gear train (37, 37'), which is functionally interposed between said connecting element (35) and said support element (36, 36').

4. The aircraft of claim 3, characterized in that said second epicyclic gear train (37, 37') comprises:
a first gear (45), which is defined by said support element (36, 36') and is rotatable about said first axis (A);
a second gear (48) rotationally integral with and driven in rotation, in use, by said hub (12) about said first axis (A);
at least one pair of third planetary gears (46); and
a second carrier (47) which is connected with said third planetary gears (46);
said third planetary gears (46) simultaneously meshing with said first gear (45) and said second gear (48), being rotatable about respective third axes (F) parallel and distinct from said first axis (A) and being mounted to revolute about said first axis (A).

5. The aircraft of claim 4, characterized in that said second carrier (47) is connected to said support structure (10) and is stationary about said first axis (A).

6. The aircraft of claim 4, characterized in that said hub (12) further comprises a fourth ring (48), which extends from said body (10) towards said first axis (A) and orthogonally to said first axis (A); said fourth ring (48) being axially interposed between said second and third ring (53, 52, 52');
said ring (48) comprising a radially inner toothing with respect to said first axis (A) meshing with radially outer toothing of said third planetary gears (46).

7. The aircraft of claim 4, wherein the source (30) of the magnetic field is driven, in use, in rotation at a first rotational speed ($\omega 1$); and the electric conductive element (32), is driven, in use, in rotation at a second rotational speed ($\omega 2$) different from said first rotational speed ($\omega 1$).

8. The aircraft of claim 7, characterized in that said second carrier (47) is connected to said sun gear (20) of said first epicyclic gear (17) and is rotatable about said first axis (A) with a third rotational speed ($\omega 0$) different from said first and second rotational speed ($\omega 1$, $\omega 2$).

9. The aircraft of claim 3, characterized in that said second epicyclic gear train (37') and said support element (36') are axially contained inside the axial size of said hub (12).

10. The aircraft of claim 1, characterized in that said flow deflector (85) comprises at least one of: an electrical power storage means (89) electrically connected to said electrical conductive element (32) and heat dissipating means (90) for dissipating the heat generated, in use, by said source (30) and said electrical conductive element (32).

11. The aircraft of claim 1, characterized in that said support element (36, 36', 36") comprise a pair of thirds rings (39, 40) which support respective sources (30) in a position in which they axially face with one another along said first axis (A);
said second ring (53) being axially interposed between said third rings (39, 40) along said first axis (A).

12. The aircraft of claim 1, characterized by comprising electrical connecting means (87), which are interposed between said electrical conductive element (32, 169) and said at least one blade (13, 154);
said electrical connecting means (87) being connected to an anti-icing system embedded inside said at least one blade (13).

13. The aircraft of claim 1, wherein the source (30) of the magnetic field is driven, in use, in rotation at a first rotational speed ($\omega 1$); and the electric conductive element (32), is driven, in use, in rotation at a second rotational speed ($\omega 2$) different from said first rotational speed ($\omega 1$).

* * * * *